(12) United States Patent
Adamic et al.

(10) Patent No.: US 6,607,589 B2
(45) Date of Patent: Aug. 19, 2003

(54) CYAN INK FORMULATION

(75) Inventors: Raymond J Adamic, Corvallis, OR (US); Richard A Sader, San Diego, CA (US); Gary W Byers, Vista, CA (US); Paul J. Bruinsma, San Diego, CA (US); Howard A. Doumaux, San Diego, CA (US); Kai Kong Iu, San Diego, CA (US); Richard Anderson, Escondido, CA (US); Hiang P Lauw, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 186 days.

(21) Appl. No.: 09/837,445

(22) Filed: Apr. 17, 2001

(65) Prior Publication Data

US 2003/0127019 A1 Jul. 10, 2003

(51) Int. Cl.$^7$ .......................... C09D 11/00; C09D 11/02
(52) U.S. Cl. .................................................. 106/31.49
(58) Field of Search ........................ 106/31.49; 540/133

(56) References Cited

U.S. PATENT DOCUMENTS

| | | | | |
|---|---|---|---|---|
| 2,459,773 A | * | 1/1949 | Mayhew | 540/133 |
| 3,053,849 A | * | 9/1962 | Clark et al. | 540/132 |
| 3,053,850 A | * | 9/1962 | Clark et al. | 540/133 |
| 3,365,463 A | * | 1/1968 | Groll et al. | 540/133 |
| 3,711,508 A | * | 1/1973 | Groll | 540/132 |
| 5,922,116 A | * | 7/1999 | Mistry et al. | 106/31.47 |
| 5,948,154 A | * | 9/1999 | Hayashi et al. | 106/31.48 |
| 6,149,722 A | | 11/2000 | Robertson et al. | 106/31.49 |
| 6,190,422 B1 | * | 2/2001 | Carr | 8/445 |
| 6,379,441 B1 | * | 4/2002 | Kanaya et al. | 106/31.49 |

* cited by examiner

*Primary Examiner*—Helene Klemanski
(74) *Attorney, Agent, or Firm*—W. Bradley Haymond

(57) ABSTRACT

An aqueous inkjet ink and an ink set using such ink, the ink comprising as colorant, a Copper Phthalocyanine (CuPc) dye compound having formula II:

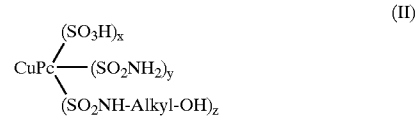

wherein (x,y,z)=4.

16 Claims, No Drawings

CYAN INK FORMULATION

FIELD OF THE INVENTION

The invention relates generally to inks for ink-jet printing and, in particular, to specific cyan inkjet ink formulations.

BACKGROUND OF THE INVENTION

Ink-jet printing is a system in which ink droplets are formed by ink ejection methods of various types, such as system utilizing electrostatic attraction, systems wherein mechanical vibration or displacement is imparted to the ink by a piezoelectric device, and systems in which ink is heated to cause it to bubble and pressure produced when it bubbles, causing the ink to adhere to a printing mediums such as paper.

Ink compositions used in such ink-jet printing systems are typically prepared by dissolving or dispersing water-soluble dyes or pigments of various types in water or mixed solvents of water and water-soluble organic solvents are known and put into use. Such ink compositions have various performances generally suited for their particular use.

As disclosed in U.S. Pat. No. 6,149,722 (Assigned to Zeneca Ltd.), the entire contents of which are incorporated by this reference, a phthalocyanine dye useful for the production of inks has the formula (I):

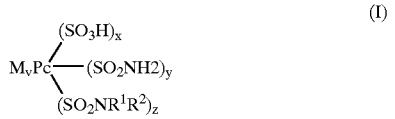

(I)

wherein M represents a metal or H; Pc represents a phthalocyanine nucleus; $R^1$ represents H or $-(CH_2)_nR^3$; $R^2$ represents $-(CH_2)R^3$; or $R^1$ or $R^2$ together with the nitrogen atom to which they are attached represent a 5 or 6-membered ring; where: n is independently an integer from 1 to 30; and $R^3$ is independently a group selected from hydroxy, sulpho, cyano, $-SR^4$, $-CO_2R^5$, $-PO_3H_2$ and $-NR^6R^7$; where: $R^4, R^5, R^6$ and $R^7$ independently represent H, $C_{1-30}$alkyl optionally substituted by one or more groups selected from hydroxy, mercapto, sulpho, carboxy, cyano and $-PO_3H_2$; v is the valence of Pc divided by the valence of M; x is from 1.2 to 3.8; y is from 0.1 to 2.7; z is from 0.1 to 2.7; and x, y and z satisfy $2 \leq x+y+z \leq 4$.

It has been found that by carefully selecting and choosing from the numerous moieties in formula I, and incorporating the selection into an ink formulation, a cyan ink-jet ink results which ink combines high chroma on plain paper and good lightfastness in vehicles having pH at most 7.

SUMMARY OF THE INVENTION

In one embodiment, the present invention relates to a cyan ink having high plain paper chroma and and good lightfastness in vehicles having pH at most 7, said cyan ink comprising:
(a) a Copper Phthalocyanine (CuPc) dye compound having formula II:

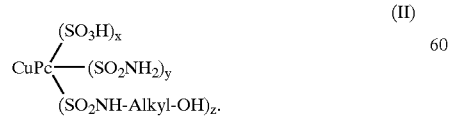

(II)

wherein $\Sigma(x,y,z)=4$; and
(b) a medium comprising water or mixtures of water and an organic solvent.

In another embodiment, the present invention relates to an ink set for ink-jet printing, said ink set comprising:
at least one yellow ink containing at least one yellow dye;
at least one magenta ink containing at least one magenta dye; and
at least one cyan ink comprising
(a) a Copper Phthalocyanine (CuPc) dye compound having formula II:

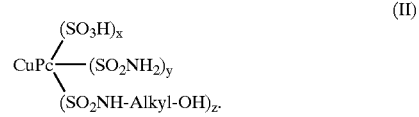

(II)

wherein $\Sigma(x,y,z)=4$; and
(b) a medium comprising water or a mixture of water and an organic solvent.

DETAILED DESCRIPTION OF THE INVENTION

The invention described herein is directed to a cyan ink particularly suitable for use in printing inkjet images using commercially available inkjet printers such as DESKJET™ printers manufactured by Hewlett-Packard Company of Palo Alto, Calif.

In order to gain improved color chroma in cyan inks, past inks would add or increase the amount of high chroma, low lightfastness dye such as AB9. Although this approach increases the color in the ink, the lightfastness of the ink system significantly decreases because dyes such as AB9 are extremely poor in light fade resistance.

The present inventors have found a way to increase the light fade resistance by using the more chromatic copper phthalocyanine dye of the present invention. This is achieved because the copper phthalocyanine dyes of the present invention have more light fade resistance, plus the ink uses less high chroma, low lightfastness dye such as AB9.

The ink of the present invention is also more soluble at the desired pH range for colored inkjet inks, around pH 4.0, than previous cyan inks. Increased solubility at pH 4.0 means ink reliability (decap) is improved over previous cyan inks.

The ink of the present invention also has a longer shelf life than previous cyan inks. In accelerated ink shelf life testing, the ink of the present invention shows less optical density (OD) loss over time when compared to previous cyan inks. Consequently, the ink of the present invention and supplies containing the ink can be kept longer without having to dispose of expired materials.

In a general embodiment, the cyan ink of the present invention has high plain paper chroma and good lightfastness in vehicles having pH at most7. The cyan ink comprises:
(a) a Copper Phthalocyanine (CuPc) compound having formula II:

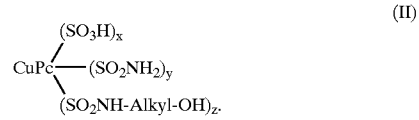

(II)

wherein $\Sigma(x,y,z)=4$; and
(b) a medium comprising water or mixtures of water and an organic solvent.

In a preferred embodiment of the above cyan ink, x is from 2.2 to 3, y is from 0.3 to 1, and z is from 0.5 to 1 in the Copper Phthalocyanine (CuPc) dye compound having formula II.

In another preferred embodiment, the medium comprises from 70 to 99.9 parts by weight of the cyan ink.

In yet another preferred embodiment, the dye comprises from 0.01 to 30 parts by weight of the cyan ink.

The resulting dye preferably has a target absorbance of from about 0.02 to about 0.39 (peak absorbance value measured at 1:10,000 dilution (100 ppm) wt/wt for the individual dye), at a nominal lambda (max.) of from about 607 to about 666 nm. More preferably, the resulting dye has a target absorbance of from about 0.04 to about 0.195 (peak absorbance value measured at 1:10,000 dilution (100 ppm) wt/wt for the individual dye), at a nominal lambda (max.) of from about 622 to about 640 nm.

In a more preferred embodiment, the cyan ink comprises Formula III:

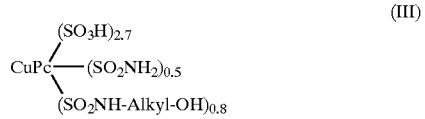

(III)

The aqueous medium used in the water-based cyan ink composition of the present invention is water, or a mixed solvent of water and a water-soluble organic solvent. Particularly preferably, it may be a mixed solvent of water and one or more water-soluble organic solvents. As the water, it is preferable to use not commonly available water containing various ions, but deionized water.

The water-soluble organic solvent(s) used as its mixture with water may include, for example, lower alcohols such as methyl alcohol, ethyl alcohol, n-propyl alcohol, isopropyl alcohol, n-butyl alcohol, sec-butyl alcohol and tert-butyl alcohol; amides such as dimethylformamide and dimethylacetamide; ketones or ketoalcohols such as acetone and diacetone alcohol; polyalkylene glycols such as polyethylene glycol and polypropylene glycol; alkylene glycols such as ethylene glycol, propylene glycol, butylene glycol, diethylene glycol, triethylene glycol, tetraethylene glycol, dipropylene glycol, tripropylene glycol, thiodiglycol and hexylene glycol; 1,5-pentanediol; glycerol; 2-pyrrolidone; N-methyl-2-pyrrolidone; and 1,3-dimethyl-2-imidazolidinone.

Surfactants suitably employed in the practice of the invention include anionic and nonionic surfactants. Examples of anionic surfactants include: Sulfonate surfactants such as Sulfosuccinates (Aerosol OT, A196; AY and GP, available from CYTEC) and Sulfonates (Aerosol DPOS-45, OS available from CYTEC; Witconate C-50H available from WITCO; Dowfax 8390 available from DOW); and Fluoro surfactants (Fluorad FC99C available from 3M). Examples of nonionic surfactants include: Fluoro surfactants (Fluorad FC170C available from 3M); Alkoxylate surfactants (Tergitol series 15S-5, 15S-7, and 15S-9 available from Union Carbide); and Organosilicone surfactants (Silwet L-77 and L-76-9 available from WITCO).

Buffers optionally employed in the practice of the invention to modulate pH can be organic-based biological buffers or inorganic buffers, preferably, organic-based. Examples of preferably-employed buffers include tris(hydroxymethyl) aminomethane (TRIS), available from companies such as Aldrich Chemical (Milwaukee, Wis.), 4-morpholineethanesulfonic acid (MES), 4-morpholinepropanesulfonic acid (MOPS), and beta-hydroxy-4-morpholinepropanesulfonic acid (MOPSO). Further, the buffers employed should provide a pH ranging from about 3 to about 9 in the practice of the invention, preferably about 3 to about 7 and most preferably from about 3.5 to about 5.

Any of the biocides commonly employed in inkjet inks may optionally be employed in the practice of the invention, such as Nuosept 95, available from Huls America (Piscataway, N.J.); Proxel GXL, available from Zeneca (Wilmington, Del.); and glutaraldehyde, available from Union Carbide Company (Bound Brook, N.J.) under the trade designation Ucarcide 250.

Inks according to the invention may optionally also include a metal chelator. Such chelators are used to bind transition metal cations that may be present in the ink. Examples of preferred metal chelators include: ethylenediaminetetraacetic acid ("EDTA"), diethylenediaminepentaacetic acid ("DPTA"), trans-1,2-diaminocyclohexanetetraacetic acid ("CDTA"), ethylenedinitrilotetraacetic acid ("EGTA"), or other chelators.

Inks according to the invention may also include light-fastness additives in appropriate amounts known to those of skill in the art.

Inks according to the invention will typically have a pH of from about 3.0 to about 7.0, preferably from about 3.5 to about 5.0.

The ink composition of the invention is suitably employed with any ink jet printer for any drop on demand ink jet technology. However, it is also useful in piezoelectric ink jet technology.

In a particular embodiment of the invention, the cyan ink composition is used in an ink set which in addition to the cyan ink also comprises at least one yellow ink containing at least one yellow dye, and at least one magenta ink containing at least one magenta dye.

In a preferred embodiment, the ink set further comprises at least one black ink containing at least one black dye.

All concentrations given herein are parts by weight, unless usage indicates to the contrary. The purity of the components is preferably that employed in normal commercial practice for inkjet inks.

The invention is further explained by the use of the following illustrative examples:

EXAMPLES

Example 1

Two cyan color inks were created containing the following ingredients as shown in Table 1a:

| Composition | PJ485 ink | DB199 (Na salt) ink |
|---|---|---|
| 2-Pyrrolidone | 6.0% | 6.0% |
| Alkyl Diol | 6.5% | 6.5% |
| Dowanol PnP | 5.0% | 5.0% |
| Silwet L7607 | 1.0% | 1.0% |
| pH adjusted to: | 7.0 | 7.0 |
| PJ485 dye (Na salt) | 3.0% | — |
| DB199 dye (Na salt) | — | 3.0% |

PJ485 dye is the copper phthalocyanine (CuPc) dye compound of Formula II:

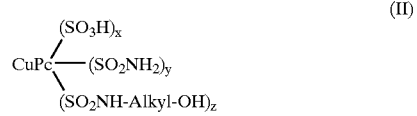

(II)

in which x is from 2.2 to 3, y is from 0.3 to 1 and z is from 0.5 to 1 and Σ(x,y,z)=4.

DB199 (Direct Blue 199) is a conventional copper-phthalocyanine dye. The PJ485 and DB199 inks were printed with HP2000C printer on two office papers, Hammermill Fore DP and Cascade Offset. Color measurements were made of the printed media images with an X-Rite Spectrodensitometer Model #938. Theses color measurements are shown in Table 1b below:

TABLE 1b

| Dye | Media | Lightness | Chroma | Hue |
| --- | --- | --- | --- | --- |
| PJ485 | Hammermill | 66 | 46 | 236 |
| PJ485 | Cascade | 65 | 45 | 235 |
| DB199 | Hammermill | 68 | 43 | 233 |
| DB199 | Cascade | 67 | 44 | 234 |

Example 2

Two cyan color inks, PJ485/AB9 and DB199/AB9, were created having the formulations given below in Table 2a:

TABLE 2a

| Composition | PJ485/AB9 ink | DB199/AB9 ink |
| --- | --- | --- |
| Alkyl Diol | 10.19 | 10.19 |
| 2-Pyrrolidone | 9.56 | 9.56 |
| Polyalkylene glycol | 4.25 | 4.25 |
| Oleyl triethoxy monodiphosphate | 0.50 | 0.50 |
| Secondary alcohol ethoxylate | 0.50 | 0.50 |
| Octyl dimethyl glycine | 1.25 | 1.25 |
| Dicarboxylic acid | 4.00 | 4.00 |
| AB9 (Na salt) | Abs. 0.06 @ 1:10,000 | Abs. 0.06 @ 1:10,000 |
| PJ485 dye (Na salt) | Abs. 0.17 @ 1:10,000 | — |
| DB199 dye (Na salt) | — | Abs. 0.17 @ 1:10,000 |

PJ485/AB9 ink color results were measured at pH 3.5, 4.0 and 5.0 and DB199/AB9 ink color results were measured at pH 3.5 and 5.0. The results are shown below in Table 2b:

TABLE 2b

|  | ROD | L | C | H |
| --- | --- | --- | --- | --- |
| Cyan 485/AB9 pH 4.0 | 1.126 | 56.1 | 41.55 | 237.63 |
| Cyan 485/AB9 pH 3.5 | 1.073 | 57.76 | 40.09 | 230.58 |
| Cyan 485/AB9 pH 5.0 | 1.133 | 57.01 | 45.09 | 246.2 |
| DB199/AB9 pH 3.5 | 1.027 | 57.22 | 37.15 | 228.93 |
| DB199/AB9 pH 5.0 | 1.122 | 55.7 | 44.91 | 250.22 |

Example 3

Two cyan color inks were created containing the formulation in Table 3a below:

TABLE 3a

| Composition | PJ485 ink | DB199 ink |
| --- | --- | --- |
| Alkyl Diol | 10.19 | 10.19 |
| 2-Pyrrolidone | 9.56 | 9.56 |
| Polyalkylene Glycol | 4.25 | 4.25 |
| Oleyl triethoxy monodiphosphate | 0.50 | 0.50 |
| Secondary alcohol ethoxylate | 0.50 | 0.50 |
| Octyl dimethyl glycine | 1.25 | 1.25 |
| Dicarboxylic acid | 4.00 | 4.00 |
| PJ485 dye (Na salt) | Abs. 0.17 @ 1:10,000 | — |
| DB199 dye (Na salt) | — | Abs. 0.17 @ 1:10,000 |

The above inks were stored at room temperature (23° C.), 60° C., 70° C., 80° C., and 90° C. for 6 weeks. The UV absorbance was measured and compared between the PJ485 and DB199 inks. Half-life calculations were determined with the results listed in Table 3b below:

TABLE 3b

| Ink | 23° C. | 60° C. | 70° C. | 80° C. | 90° C. |
| --- | --- | --- | --- | --- | --- |
| PJ485 | 19.8 | 0.5 | 0.4 | 0.2 | 0.1 |
| DB199 | 7.0 | 0.6 | 0.6 | 0.4 | 0.1 |

Example 4

Once a week for six weeks three inkjet pens were filled with aging cyan inks as well as magenta and yellow inks. The compositions of the inks used are given in Table 4a. The inks were printed on plain paper (CDC), glossy media, and on transparency media. L*c*h* was measured on the plain paper and glossy media and the color quality on the transparency was projected to inspect color qualities visually. The data shown in Table 4b compares L*C*h* of cyan, blue and green over a period of six weeks for these three inks on plain paper. The data shown in Table 4c compares L*C*h* of cyan, blue and green over a period of six weeks for these three inks on glossy paper. These L*C*h* data do not show signficant change over that period of time, nor were any visual changes noticeable in the colors of the projected transparency.

TABLE 4a

| Components | Cyan | Magenta | Yellow |
| --- | --- | --- | --- |
| Cyan 485 (Na salt) | Abs. 0.12 @ 1:10 k (485/AB9 or 485) | | |
| AB9 (Na salt) | Abs. 0.10 @ 1:10 k (485/AB9 or AB9) | | |
| M377 (Na salt) | | Abs. 0.03 @ 1:10 k | |
| AR52 (Na salt) | | Abs. 0.22 @ 1:10 k | |
| DY132 (Na salt) | | | Abs. 0.142 @ 1:10 k |
| AY23 (TMA) | | | Abs. 0.038 @ 1:10 k |

TABLE 4a-continued

| Components | Cyan | Magenta | Yellow |
|---|---|---|---|
| Alkyl Diol | 11.78 | 11.78 | 12.20 |
| 2-Pyrrolidinone | 5.94 | 5.94 | 6.05 |
| Polyethylene Glycol | 3.30 | 3.30 | 2.25 |
| Dicarboxylic Acid | 5.15 | 5.15 | 5.15 |
| Sodium hexadecyl diphenyloxide disulfonate | 0.50 | 0.50 | 0.50 |
| Secondary Alcohol Ethoxylate | 0.71 | 0.71 | 0.92 |
| Octyl dimethyl glycine | 4.36 | 4.36 | 3.44 |
| Oleyl triethoxy monodiphosphate | 0.38 | 0.38 | 0.25 |
| Chelating agent | 0.13 | 0.13 | 0.13 |

TABLE 4b

| Plain paper | | | Initial | 1 wk | 2 wks | 3 wks | 4 wks | 5 wks | 6 wks |
|---|---|---|---|---|---|---|---|---|---|
| 485 only | Cyan | L* | 65.4 | 66.6 | 66.9 | 67.1 | 66.9 | 66.9 | 66.5 |
| | | C* | 43.2 | 43.0 | 42.9 | 42.8 | 43.4 | 43.0 | 43.5 |
| | | h* | 230.7 | 231.1 | 227.6 | 227.7 | 228.3 | 232.0 | 229.5 |
| | Blue | L* | 41.2 | 41.7 | 40.4 | 40.4 | 40.6 | 41.8 | 40.2 |
| | | C* | 34.7 | 35.0 | 34.1 | 34.9 | 34.4 | 39.2 | 38.3 |
| | | h* | 308.4 | 309.0 | 307.5 | 312.2 | 308.4 | 309.4 | 308.1 |
| | Green | L* | 65.1 | 65.7 | 65.2 | 65.9 | 64.8 | 65.4 | 64.1 |
| | | C* | 50.2 | 50.9 | 52.8 | 53.5 | 52.0 | 54.2 | 55.3 |
| | | h* | 150.1 | 148.6 | 146.6 | 142.5 | 150.3 | 142.5 | 143.3 |
| AB9 only | Cyan | L* | 80.9 | 81.2 | 81.1 | 81.0 | 81.3 | 81.2 | 80.8 |
| | | C* | 30.4 | 29.9 | 30.4 | 30.8 | 31.0 | 30.0 | 31.5 |
| | | h* | 218.0 | 217.9 | 217.9 | 218.3 | 218.0 | 218.2 | 218.7 |
| | Blue | L* | 46.1 | 46.8 | 45.5 | 44.6 | 43.3 | 46.5 | 44.5 |
| | | C* | 41.2 | 40.7 | 40.2 | 42.5 | 42.2 | 43.7 | 43.3 |
| | | h* | 332.4 | 331.7 | 331.5 | 334.9 | 331.6 | 329.0 | 327.7 |
| | Green | L* | 77.6 | 77.8 | 76.9 | 77.6 | 77.3 | 77.5 | 76.2 |
| | | C* | 55.5 | 55.9 | 58.7 | 60.7 | 56.6 | 60.9 | 62.2 |
| | | h* | 126.6 | 126.6 | 127.0 | 123.1 | 127.8 | 122.3 | 123.5 |
| 485 & AB9 | Cyan | L* | 63.7 | 64.4 | 64.9 | 64.7 | 64.5 | 65.5 | 64.5 |
| | | C* | 44.3 | 44.5 | 44.2 | 44.0 | 44.6 | 44.2 | 44.7 |
| | | h* | 231.5 | 232.1 | 228.8 | 229.3 | 229.8 | 232.0 | 230.8 |
| | Blue | L* | 40.2 | 40.6 | 39.6 | 39.6 | 39.8 | 40.6 | 39.0 |
| | | C* | 34.2 | 34.4 | 33.7 | 34.1 | 33.6 | 38.3 | 37.5 |
| | | h* | 304.9 | 304.9 | 304.2 | 307.8 | 303.8 | 306.9 | 304.0 |
| | Green | L* | 63.6 | 63.9 | 62.8 | 63.9 | 62.5 | 64.2 | 61.9 |
| | | C* | 51.0 | 51.3 | 53.5 | 53.4 | 51.8 | 55.3 | 55.0 |
| | | h* | 153.0 | 151.9 | 151.8 | 146.5 | 154.2 | 144.2 | 147.0 |

TABLE 4c

| Glossy Media | | | Initial | 1 wk | 2 wks | 3 wks | 4 wks | 5 wks | 6 wks |
|---|---|---|---|---|---|---|---|---|---|
| 485 only | Cyan | L* | 64.0 | 64.6 | 65.1 | 65.2 | 64.6 | 65.5 | 65.2 |
| | | C* | 52.5 | 51.9 | 51.8 | 52.1 | 53.1 | 51.5 | 52.4 |
| | | h* | 232.7 | 233.0 | 232.7 | 232.6 | 232.8 | 232.7 | 232.6 |
| | Blue | L* | 22.0 | 25.1 | 23.9 | 21.7 | 19.4 | 35.6 | 19.2 |
| | | C* | 73.8 | 71.9 | 72.3 | 74.6 | 75.1 | 60.0 | 75.4 |
| | | h* | 314.9 | 313.4 | 315.5 | 317.1 | 318.3 | 302.8 | 319.5 |
| | Green | L* | 61.0 | 61.5 | 62.2 | 62.1 | 61.1 | 62.4 | 61.6 |
| | | C* | 75.2 | 76.2 | 75.6 | 76.9 | 79.8 | 76.3 | 79.7 |
| | | h* | 140.5 | 138.0 | 137.4 | 139.2 | 136.5 | 136.3 | 136.5 |
| AB9 only | Cyan | L* | 82.0 | 81.9 | 82.0 | 81.8 | 81.8 | 82.1 | 81.8 |
| | | C* | 33.5 | 33.2 | 33.5 | 33.8 | 34.0 | 33.1 | 33.9 |
| | | h* | 220.1 | 220.8 | 220.2 | 220.2 | 220.1 | 220.4 | 220.2 |
| | Blue | L* | 32.6 | 34.4 | 35.8 | 29.2 | 32.2 | 34.5 | 33.5 |
| | | C* | 73.8 | 72.6 | 71.5 | 74.2 | 74.6 | 72.5 | 72.6 |
| | | h* | 331.3 | 329.9 | 328.9 | 334.1 | 330.9 | 330.0 | 330.1 |
| | Green | L* | 77.0 | 77.1 | 77.0 | 76.6 | 76.4 | 77.0 | 77.1 |
| | | C* | 80.1 | 81.2 | 81.6 | 85.2 | 86.4 | 82.8 | 81.9 |
| | | h* | 116.9 | 116.5 | 116.5 | 115.5 | 114.9 | 115.6 | 117.3 |
| 485 & AB9 | Cyan | L* | 61.7 | 62.9 | 64.1 | 62.9 | 62.8 | 63.5 | 62.4 |
| | | C* | 54.5 | 54.5 | 52.5 | 54.1 | 54.3 | 53.3 | 54.8 |
| | | h* | 233.3 | 233.0 | 232.5 | 233.0 | 232.8 | 233.0 | 233.1 |
| | Blue | L* | 21.1 | 24.0 | 31.4 | 18.7 | 19.6 | 22.4 | 17.6 |
| | | C* | 73.3 | 70.7 | 62.9 | 75.8 | 74.7 | 73.0 | 76.1 |
| | | h* | 311.3 | 311.0 | 304.2 | 315.2 | 314.7 | 314.7 | 315.4 |
| | Green | L* | 58.9 | 60.2 | 61.0 | 60.0 | 59.9 | 60.2 | 59.1 |
| | | C* | 76.8 | 75.9 | 77.1 | 78.1 | 78.6 | 77.6 | 80.5 |
| | | h* | 144.5 | 141.2 | 139.5 | 143.5 | 143.4 | 140.2 | 142.1 |

What is claimed is:

1. A cyan ink having high plain paper chroma and good lightfastness in vehicles having pH at most 7, said cyan ink comprising:

(a) a Copper Phthalocyanine (CuPc) dye compound having formula II:

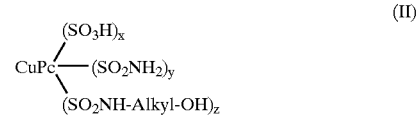

(II)

wherein $\Sigma(x,y,z)=4$; x is from 2.2 to 3, y is from 0.3 to 1, and z is from 0.5 to 1; the dye comprises from 0.01 to 30 parts by weight of the cyan ink; and the cyan ink has a pH of from about 3 to about 7; and (b) a medium comprising water or mixtures of water and an organic solvent.

2. The cyan ink of claim 1 wherein the Copper Phthalocyanine (CuPc) dye compound has formula III:

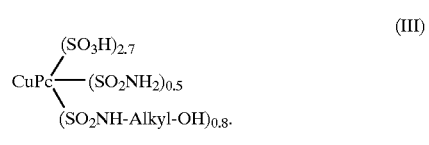

(III)

3. The cyan ink of claim 1 wherein the medium comprises from 70 to 99.99 parts by weight of the cyan ink.

4. The cyan ink of claim 1 further comprising at least one component independently selected from the group consisting of surfactants, buffers, biocides, metal chelators, and mixtures thereof.

5. The cyan ink of claim 1 wherein said cyan dye is the only dye in said ink.

6. The cyan ink of claim 1 wherein said ink further comprises Acid Blue 9 (AB9).

7. The cyan ink of claim 1 wherein the cyan ink has a pH of from about 3.5 to about 5.

8. The cyan ink of claim 1 further comprising a surfactant.

9. The cyan ink of claim 1 wherein the cyan dye has a visible light absorbance of from about 0.02 to about 0.39 at a lambda$_{max}$ of from 607 to 666 and at a 1:10,000 dilution in water.

10. The cyan ink of claim 1 wherein the cyan dye has a visible light absorbance of about 0.04 to 0.195 at a lambda$_{max}$ of from about 622 to 664 and at a 1:10,000 dilution in water.

11. An ink set for ink-jet printing, said ink set comprising:
   at least one yellow ink containing at least one yellow dye;
   at least one magenta ink-containing at least one magenta dye; and
   at least one cyan ink comprising
      (a) a Copper Phthalocyanine (CuPc) dye compound having formula II:

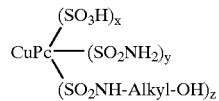

(II)

wherein
   $\Sigma(x,y,z)=4$; x is from 2.2 to 3, y is from 0.3 to 1, and z is from 0.5 to 1; the dye comprises from 0.01 to 30 parts by weight of the cyan ink; and the cyan ink has a pH of from about 3 to about 7; and
   (b) a medium comprising water or mixtures of water and an organic solvent.

12. The ink set of claim 11, wherein the Copper Phthalocyanine dye compound has Formula II:

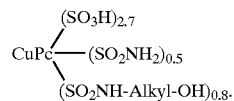

(III)

13. The ink set of claim 11 further comprising at least one black ink containing at least one black dye.

14. The ink set of claim 11 wherein the at least one cyan in further comprises Acid Blue 9 (AB9).

15. The ink set of claim 11 herein the cyan dye has a visible light absorbance of from about 0.02 to about 0.39 at a lambda$_{max}$ of from 607 to 666 and at a 1:10,000 dilution in water.

16. The ink set of claim 11 wherein the cyan dye has a visible light absorbance of about 0.04 to 0.195 at a lambda$_{max}$ of from about 622 to 664 and at a 1:10,000 dilution.

* * * * *

UNITED STATES PATENT AND TRADEMARK OFFICE
CERTIFICATE OF CORRECTION

PATENT NO. : 6,607,589 B2  Page 1 of 1
DATED : August 19, 2003
INVENTOR(S) : Adamic et al.

It is certified that error appears in the above-identified patent and that said Letters Patent is hereby corrected as shown below:

<u>Column 10,</u>
Line 28, delete "dilution." and insert therefor -- dilution in water. --

Signed and Sealed this

Seventeenth Day of February, 2004

JON W. DUDAS
*Acting Director of the United States Patent and Trademark Office*